US008234332B2

United States Patent
Jaudon et al.

(10) Patent No.: US 8,234,332 B2
(45) Date of Patent: Jul. 31, 2012

(54) SYSTEMS AND METHODS FOR UPDATING COMPUTER MEMORY AND FILE LOCATIONS WITHIN VIRTUAL COMPUTING ENVIRONMENTS

(75) Inventors: Joe Jaudon, Sedalia, CO (US); David Lowrey, Denver, CO (US); Adam Williams, Denver, CO (US)

(73) Assignee: Aventura HQ, Inc., Denver, CO (US)

( * ) Notice: Subject to any disclaimer, the term of this patent is extended or adjusted under 35 U.S.C. 154(b) by 606 days.

(21) Appl. No.: 12/428,404

(22) Filed: Apr. 22, 2009

(65) Prior Publication Data

US 2010/0274837 A1    Oct. 28, 2010

(51) Int. Cl.
*G06F 15/16*    (2006.01)

(52) U.S. Cl. ........................................ 709/203; 709/219

(58) Field of Classification Search .................... 709/203
See application file for complete search history.

(56) References Cited

U.S. PATENT DOCUMENTS

| | | | |
|---|---|---|---|
| 5,923,850 A | 7/1999 | Barroux | |
| 6,085,247 A | 7/2000 | Parsons, Jr. et al. | |
| 6,199,099 B1 | 3/2001 | Gershman et al. | |
| 6,201,611 B1 * | 3/2001 | Carter et al. | 358/1.15 |
| 6,349,337 B1 | 2/2002 | Parsons, Jr. et al. | |
| 6,463,459 B1 | 10/2002 | Orr et al. | |
| 6,571,290 B2 | 5/2003 | Selgas et al. | |
| 6,615,264 B1 | 9/2003 | Stoltz et al. | |
| 6,691,154 B1 | 2/2004 | Zhu et al. | |
| 6,912,578 B1 | 6/2005 | Hanko | |
| 6,920,502 B2 | 7/2005 | Araujo | |
| 7,076,797 B2 | 7/2006 | Loveland | |
| 7,085,805 B1 | 8/2006 | Ruberg et al. | |
| 7,092,943 B2 | 8/2006 | Roese et al. | |
| 7,107,308 B2 | 9/2006 | Madany et al. | |
| 7,215,947 B2 | 5/2007 | Dowling et al. | |
| 7,346,689 B1 | 3/2008 | Northcutt et al. | |
| 7,353,234 B2 | 4/2008 | Kimball et al. | |
| 7,363,363 B2 | 4/2008 | Dal Canto et al. | |
| 7,502,835 B1 | 3/2009 | Cheng | |
| 7,636,890 B2 | 12/2009 | Marcjan et al. | |
| 7,653,234 B2 | 1/2010 | Warren et al. | |
| 7,657,782 B2 | 2/2010 | Das et al. | |
| 7,685,257 B2 * | 3/2010 | King et al. | 709/219 |
| 7,707,507 B1 | 4/2010 | Rowe et al. | |
| 7,716,591 B2 | 5/2010 | Chen et al. | |
| 7,802,197 B2 | 9/2010 | Lew et al. | |
| 2002/0091697 A1 | 7/2002 | Huang et al. | |
| 2002/0099806 A1 * | 7/2002 | Balsamo et al. | 709/223 |
| 2002/0169967 A1 | 11/2002 | Varma et al. | |

(Continued)

OTHER PUBLICATIONS

"Using X Window." Stanford University School of Earth Sciences. Aug. 6, 2004. Retrieved on Dec. 16, 2011: <http://pangea.stanford.edu/computing/unix/xterminal/xclients.php>. pp. 1-2.*

(Continued)

*Primary Examiner* — Christopher Biagini
(74) *Attorney, Agent, or Firm* — Holland & Hart LLP (57) ABSTRACT

The present invention provides systems and methods for dynamically updating computer memory and modifying function requests within virtual computing environments. Methods for updating computer memory environmental variables may comprise methods for modifying, computer processes, methods for providing client applications to capture and respond to information requests, and methods for configuring application frameworks to capture and respond to information requests.

22 Claims, 7 Drawing Sheets

U.S. PATENT DOCUMENTS

| | | | |
|---|---|---|---|
| 2003/0037174 A1* | 2/2003 | Lavin et al. | 709/313 |
| 2003/0046401 A1 | 3/2003 | Abbott et al. | |
| 2003/0069924 A1 | 4/2003 | Peart et al. | |
| 2003/0149866 A1 | 8/2003 | Neuman | |
| 2003/0154398 A1 | 8/2003 | Eaton et al. | |
| 2004/0006706 A1 | 1/2004 | Erlingsson | |
| 2004/0105420 A1 | 6/2004 | Takeda et al. | |
| 2004/0121299 A1 | 6/2004 | Rougeau et al. | |
| 2004/0240652 A1 | 12/2004 | Kanada | |
| 2004/0243701 A1 | 12/2004 | Hardwicke et al. | |
| 2005/0060670 A1 | 3/2005 | Inui et al. | |
| 2005/0097506 A1 | 5/2005 | Heumesser | |
| 2005/0193118 A1 | 9/2005 | Le et al. | |
| 2005/0198239 A1 | 9/2005 | Hughes | |
| 2005/0204013 A1 | 9/2005 | Raghunath et al. | |
| 2006/0070131 A1 | 3/2006 | Braddy et al. | |
| 2006/0146767 A1 | 7/2006 | Moganti | |
| 2006/0230105 A1 | 10/2006 | Shappir et al. | |
| 2006/0271517 A1* | 11/2006 | Deloach, Jr. | 707/3 |
| 2007/0174429 A1 | 7/2007 | Mazzaferri et al. | |
| 2007/0233869 A1 | 10/2007 | Jodh et al. | |
| 2007/0234048 A1 | 10/2007 | Ziv | |
| 2007/0239859 A1 | 10/2007 | Wilkinson et al. | |
| 2007/0288598 A1 | 12/2007 | Edeker et al. | |
| 2007/0299796 A1 | 12/2007 | Macbeth et al. | |
| 2007/0300185 A1 | 12/2007 | Macbeth et al. | |
| 2008/0034057 A1 | 2/2008 | Kumar et al. | |
| 2008/0096529 A1 | 4/2008 | Zellner | |
| 2008/0155308 A1 | 6/2008 | McDonough et al. | |
| 2008/0201485 A1 | 8/2008 | Patwardhan et al. | |
| 2008/0204789 A1 | 8/2008 | Hooglander | |
| 2008/0209045 A1 | 8/2008 | Rothstein et al. | |
| 2009/0006537 A1 | 1/2009 | Palekar et al. | |
| 2009/0024994 A1 | 1/2009 | Kannan et al. | |
| 2009/0061925 A1 | 3/2009 | Finkelstein et al. | |
| 2009/0073965 A1 | 3/2009 | Dowling et al. | |
| 2009/0086021 A1 | 4/2009 | Baier et al. | |
| 2009/0089709 A1 | 4/2009 | Baier et al. | |
| 2009/0098825 A1 | 4/2009 | Huomo et al. | |
| 2009/0187654 A1 | 7/2009 | Raja et al. | |
| 2009/0198769 A1 | 8/2009 | Keller et al. | |
| 2009/0204768 A1* | 8/2009 | Bruening et al. | 711/136 |
| 2009/0216833 A1* | 8/2009 | Chen et al. | 709/203 |
| 2009/0319462 A1 | 12/2009 | Tirpak et al. | |

OTHER PUBLICATIONS

U.S. Appl. No. 12/245,667, Non-final Office Action dated Mar. 25, 2011, 15 pp.
U.S. Appl. No. 12/245,662, Final Office Action dated Apr. 1, 2011, 17 pp.
U.S. Appl. No. 12/575,391, Non-final Office Action dated Aug. 19, 2011, 14 pp.
U.S. Appl. No. 12/575,382, Non-final Office Action dated Aug. 22, 2011, 14 pp.
U.S. Appl. No. 12/575,385, Non-final Office Action dated Sep. 8, 2011, 19 pp.
MacCormac et al.: "A Framework for a Session Mobility System" (online) May 11, 2007 Retrieved from URL: http://www.comp.dit.ie/dmaccormac/publications/maccormac07framework.pdf.
MacCormac et al.: "A thin client approach to supporting adaptive session mobility," Advances in Grid and Pervasive Computing. Second International Conference. GPC 2007. Proceedings (Lecture notes in computer science vol. 4459) Springer Berlin, Germany, 2007, pp. 694-701.
L. Patanapongpibul, G. Mapp: "Mobility Support for Thin-Client Systems" (online) Nov. 2003. Retrieved from URL: http://www.cl.cam.ac.uk/research/dtg/publications/public/1bp22/patanapongpibul_evolute.pdf.
Schmidt: "supporting ubiquitous computing with stateless consoles and computation caches," (online) Aug. 2000. Retrieved from URL: http://i30www.ibs.uka.de/teaching/coursedocuments/73/SLIM-dissertion-schmidt.pdf.
International Application No. PCT/US2010/023675, International Search Report and Written Opinion dated Mar. 18, 2010, 7 pages.
International Application No. PCT/US2009/059595, International Search Report and Written Opinion dated Jan. 19, 2010, 9 pages.
U.S. Appl. No. 12/245,667, Office Action dated May 13, 2010. 12 pages.
U.S. Appl. No. 12/245,667, Office Action dated Aug. 17, 2010, 12 pages.
U.S. Appl. No. 12/245,662, Office Action dated Aug. 31, 2010, 12 pages.
U.S. Appl. No. 12/245,667, Final Office Action dated Dec. 8, 2011, 18 pgs.
"Using X Window," Stanford University School of Earth Sciences, Aug. 6, 2004, http://pangea.standford.edu/computing/unix/xterminal/xclients.php retrieved Dec. 16, 2011, 2 pgs.

* cited by examiner

SYSTEMS AND METHODS FOR UPDATING COMPUTER MEMORY AND FILE LOCATIONS WITHIN VIRTUAL COMPUTING ENVIRONMENTS

TECHNICAL FIELD

The present invention relates generally to desktop and application virtualization, and more particularly, some embodiments relate to dynamically updating computer memory to configure environmental and location-based information within a virtual computing environment and to modify process requests related to environmental and location-based information.

DESCRIPTION OF THE RELATED ART

In computer-related fields, virtualization is a broad term referring to the abstraction of resources. Desktop virtualization is the decoupling of a user's physical machine from the desktop and software. Often, desktop virtualization comprises emulating a PC hardware environment of a client and running a virtual machine alongside the existing operating system located on the local machine. Other desktop virtualization methods comprise delivering a virtual machine to a thin client from a datacenter server. Application virtualization is a general term describing software technologies that allow applications to function without being installed and configured directly on the terminal or computing device at the point of user access. Virtualized applications are typically served up and accessed by users from the network via centralized servers, virtualized desktop or application platforms, such as Citrix®, Terminal Services, and VMware.

In standard distributed computing environments, computer memory as embodied by environmental variables and other location-based information such as IP and other network addresses, a client name and a host name are used by applications to identify certain properties about a user session and provide certain location-based functionality, such as printing, policy updates, application delivery, and data access. In the standard distributed model, this information is acquired through various OS or application functions and is typically applicable and static for the duration of the user session. The information typically represents identification and demographic information about the location where the session was initiated, such as network addresses and client or host names. These variables in computer memory are fixed by the OS, network, and hardware that the user uses to access their session and are typically accessed by applications through normal system functions or calls or directly through localized process functions.

In virtualized environments, the same virtual session can be served up to or displayed to multiple computing devices (eg: personal computer, laptop, pen-tab, mobile phone) during the life of the session. In these instances location-based information does not reflect the true client-side run-time environment. Instead, this information represents static variables during the life of the session and information about the network, server, virtual platform where the user's virtual session resides, or the computing device from which the initial user session was accessed. Accordingly, when an application requests computer memory containing location-based information, the result is data that is not associated with the current computing device from which the user is accessing. This prevents the application from properly using the computer memory, e.g., environmental variables or other information for specific location dependent functions such as printing, policy updates, application delivery, and data access.

BRIEF SUMMARY OF EMBODIMENTS OF THE INVENTION

The present invention provides systems and methods for dynamically updating computer memory within virtual computing environments and systems and methods to modify any location-based function requests for location-based information. Methods for updating computer memory and function requests may comprise methods for modifying any arbitrary computer process, methods for providing client applications to capture and respond to information requests, and methods for configuring frameworks or any other application to capture and respond to information requests.

According to an embodiment of the invention, a method of updating client information comprises obtaining client location-based information during a virtual session; capturing an application information request; and responding to the request based on the client location-based information.

According to another embodiment of the invention, a computer program product comprises a computer useable medium having computer program code embodied therein for enabling a computing device to perform the functions of obtaining client location-based information during a virtual session; capturing an application information request; and responding to the request based on the client location-based information.

According to a further embodiment of the invention, a system for providing virtual session client location-based information, comprises a client-side application; and a server-side application; wherein the system is configured to obtain client location-based information during a virtual session between the client-side application and the server-side application; capture an application information request; and respond to the request based on the client location-based information.

In a further embodiment of the invention, the step of capturing comprises manipulating a computer process to reflect the obtained client location-based information.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and methods for updating computer memory within virtual computing environments. In one embodiment, an application's requests for computer memory, represented by environmental variables are captured such that a response to the request is provided that reflects a client environmental variable rather than a server's environmental variables.

Figure 1:
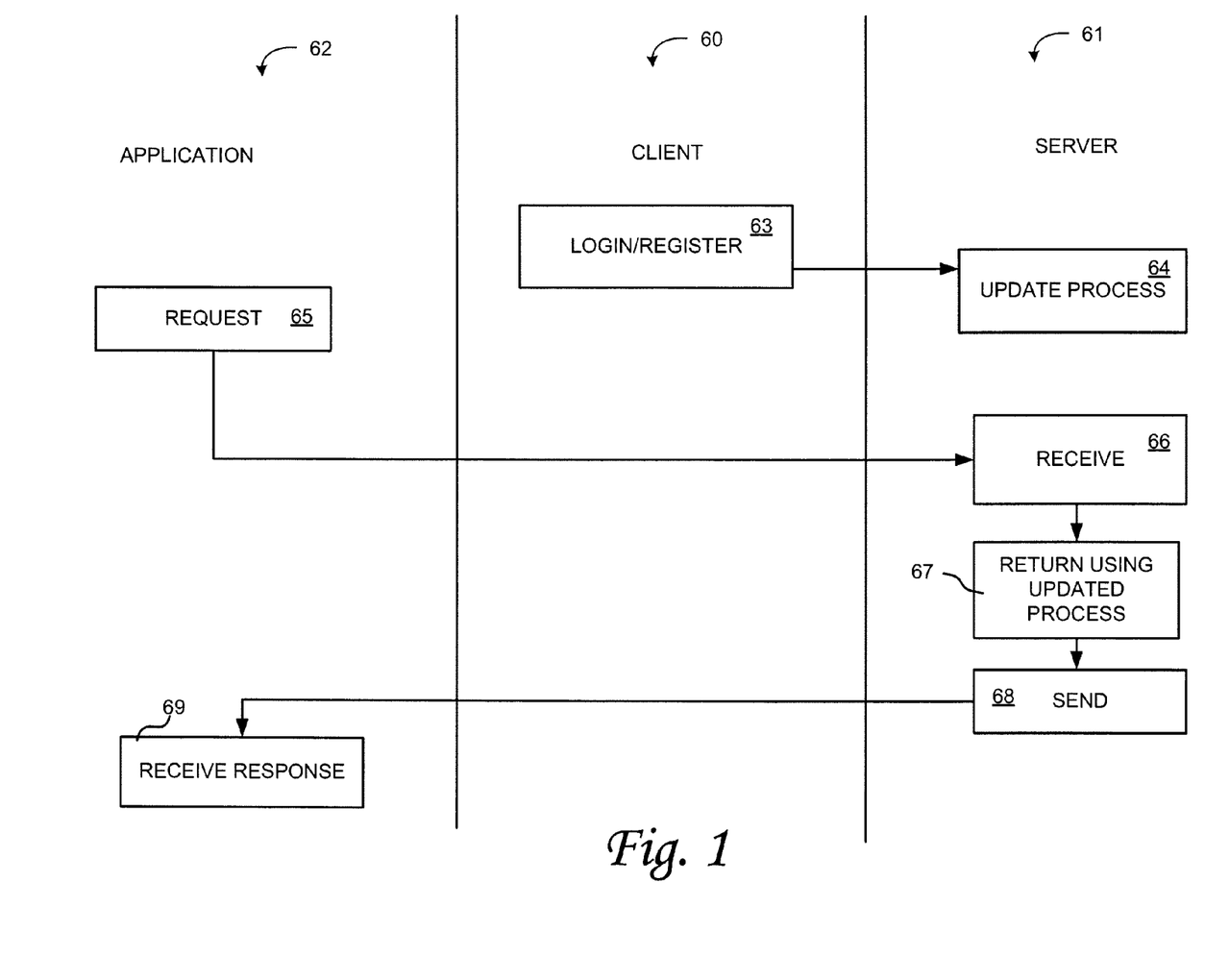
FIG. 1 illustrates a system and method for updating location-based information according to an embodiment of the invention.

FIG. 1 illustrates a system and method for updating location-based information according to an embodiment of the invention. In the illustrated embodiment, a virtual session is initiated between a client 60 and a server 61. The client 60 begins the virtual session by logging in or registering with the server 63. During the login process 63 or during the initiation of the virtual session, the server 61 obtains client location-based information from client 60. Such client location-based information might be stored within environment variables and contain other identifying information, such as the client IP address, the client name, or the client's host name. In other embodiments, the server 61 may store location-based information regarding various clients, or a client location configuration server may be provided to store such location-based information. In these embodiments, the step of obtaining the client location-based information may comprise the server retrieving the client location-based information from itself or from the client location configuration server.

In this embodiment, the server updates a computer process 64 to reflect this obtained information. For example, such computer processes 64 might comprise system dynamically linked libraries (DLLs). For example, if application 62 comprises a virtual application running on a hosted virtual desktop, then the step of updating the process 64, might comprise providing a virtual DLL reflecting the obtained information and configured such that requests for environmental variables from the application are directed to the virtual DLL. As another example, the application 62 comprises a hosted application running on a server 61, and the step of updating process 64 comprises modifying the relevant processes directly, or configuring an intermediary software such that requests for system environment variables are intercepted and captured by the intermediary software such that the client location-based information may be returned in response to the system requests.

Accordingly, after the processes have been updated 64, when an application 62 requests 65 an environment variable or other type of location-based identifier, the server receives 66 the request and passes it to the updated process 67. Because the process has been updated to reflect the client's environmental information, the sent response 68 corresponds to the appropriate environment variable based on the physical location and specific device of the client 60 as configured by the updating step 64. Therefore, the received response 69 allows the application to provide a resource or function to the client 60 that corresponds to a locally available resource or function configured by updating step 64. For example, if application 62 requested a network location of the client 60 for purposes of providing a default local printer, instead of receiving the server's network location in response to a network location request, the application would receive the client's network location and may accordingly determine an appropriate local printer located near the client. In further embodiments, other methods of updating server information may be utilized. For example, in one embodiment the system functions themselves may be modified to return appropriate client location-based information.

Figure 2:
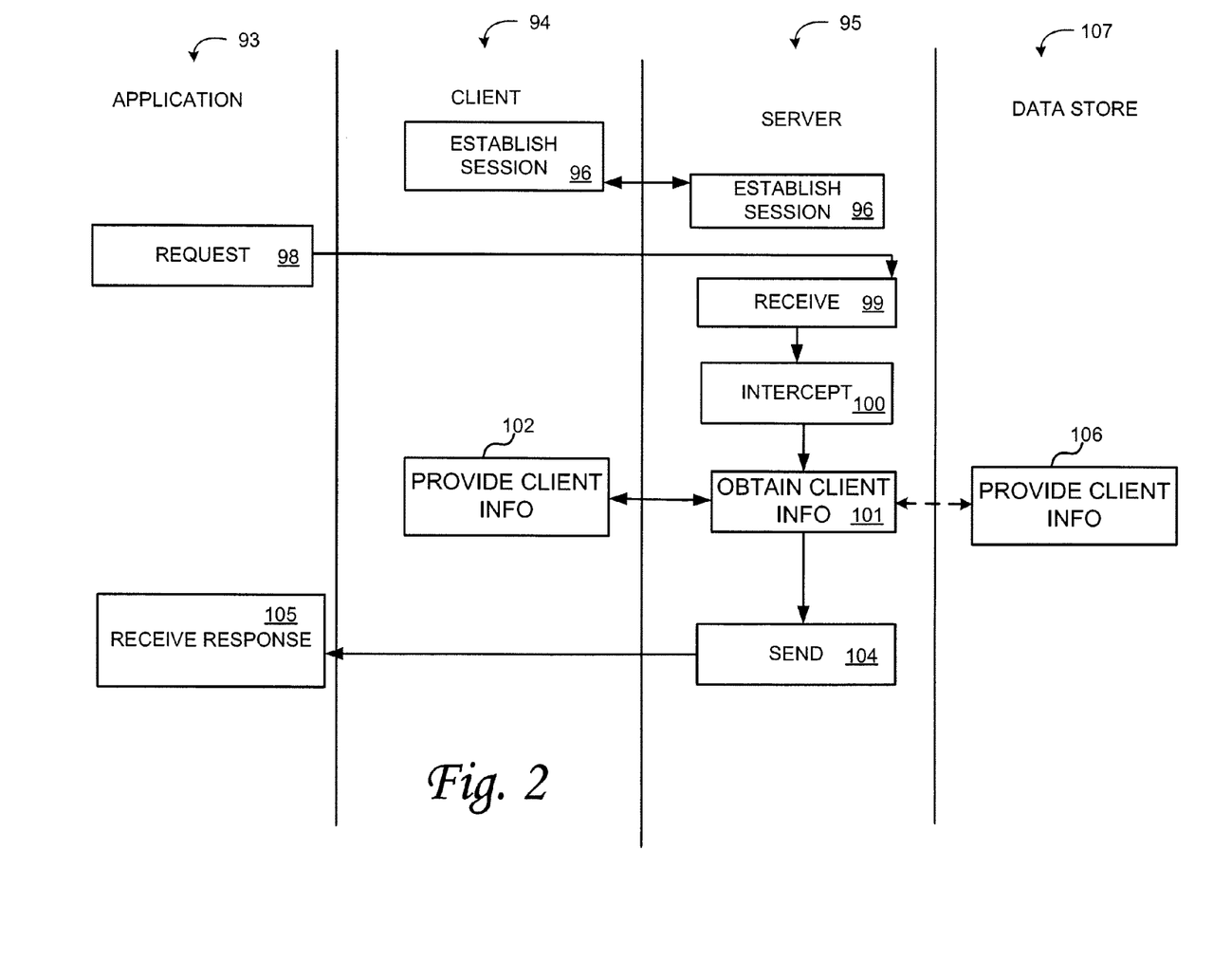
FIG. 2 illustrates a server centric method of capturing information requests and updating client location-based information according to an embodiment of the invention.

FIG. 2 illustrates a server centric method of capturing information requests and updating client location-based information according to an embodiment of the invention. In the illustrated embodiment, a client 94 and a server 95 establish a session 96, such as a virtual desktop session, a virtual application session, or web-based application session. A user may direct an application 93 accessed through client 94, but hosted on server 95, to provide a location-based function, such as a policy update. Accordingly, application 93 initiates a request 98, for example through an OS function call, which is received 99 by server 95. In this embodiment, the server is configured to intercept 100 such information requests, for example by inspecting information requests received by applications to determine if they require location-based information.

In the illustrated embodiment, the server 95 is further configured to obtain the client location-based information 101 after the request is intercepted 100. Server 95 transmits a request to client 94 to provide the client location-based information 102, such as an appropriate client environment variable. Server 95 is further configured to provide the obtained client location-based information 104 to the application 93. Accordingly, the result 105 received in response to the information request 98 corresponds to the appropriate client-side environmental information rather than the server-side environmental information. Therefore, the location-based function, such as the policy update, will be applied to the client rather than the server. In other embodiments, information storage system may be provided to store the client information. For example, a data store system 107 might comprise an external computing device, database, or policy engine configured to store various client location-based information. In these embodiments, the step of obtaining client information 101 may comprise querying the data store 107 to provide the client information 106.

Figure 3:
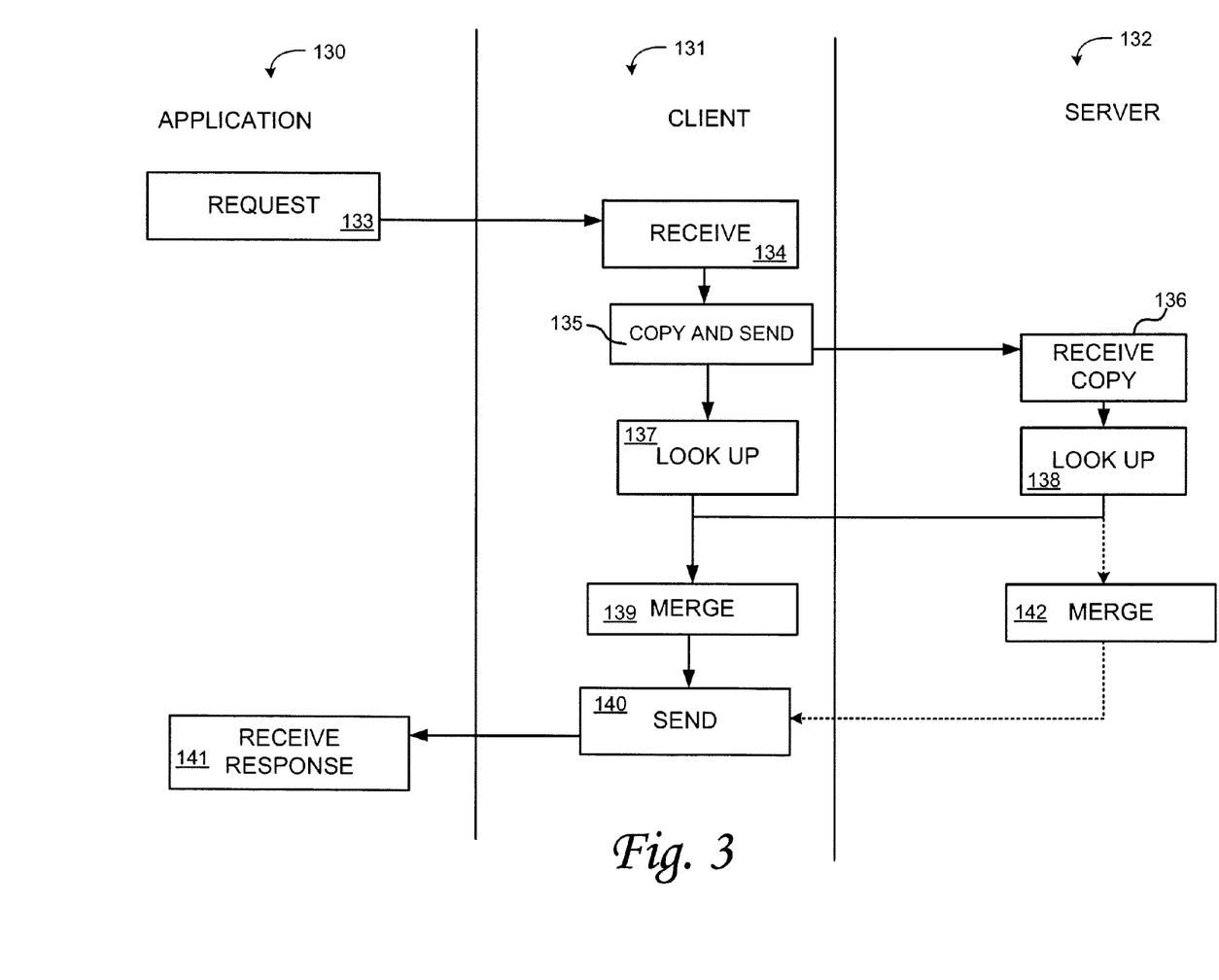
FIG. 3 illustrates a system and method for client-side environmental variable capture and return according to an embodiment of the invention

FIG. 3 illustrates a system and method for client-side computer memory capture and return according to an embodiment of the invention. For example, such client-side environmental variable capture might occur on rich or hybrid clients capable of performing substantive computations based on data received from a server 132. In the illustrated embodiment, application 130 may comprise an application with both client-side and server-side functionality, and may be configured such that network communications occur via intermediary applications, such as an application on the client computer configured to provide a user interface on the client terminal.

When application 130 initiates a request 133 for an environment variable or other location-based information, client 131 receives the request 134.

In some embodiments, such requests may require responses comprising information about the client and information about the server. Accordingly, embodiments may be configured such that both the server and the client receive the appropriate information requests. For example, a client 131 may copy and send 135 any received information request to server 132. Server 132 then receives a copy 136 and performs the lookup 138 to respond with the requested information and send it to the client 131. Simultaneously, the client 131 may perform a lookup 137 using local resources according to the information request. Client 131 may be configured to merge 139 the information received from the server and the locally obtained information to formulate a response that provides the appropriate client location-based information into the appropriate server location-based information. Clients 131 then sends this formulated response 142 application 130. Application 130 may then utilize the received response 141 to provide location-based functionality or resources.

In other embodiments, the server 132 may be configured to implement the merge function 142. In these embodiments, the client 131 may be configured to transmit the results of the lookup function 137 to server 132 such that the server merges 142 the results of its lookup function 138 with the client results 137 to allow the formulated response to be sent 140 to the application 130.

Figure 4:
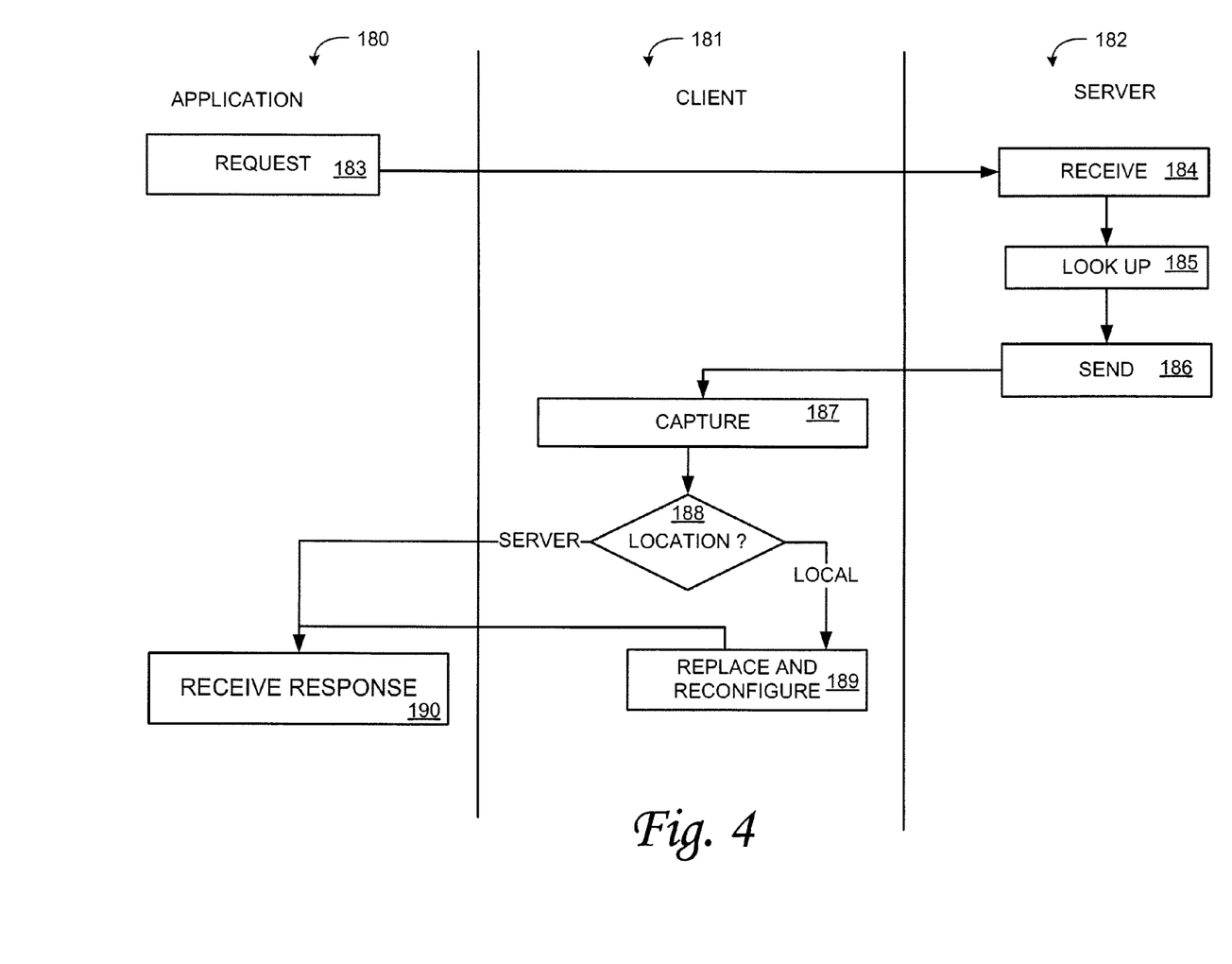
FIG. 4 illustrates a system and method for server-side data capture according to an embodiment of the invention.

FIG. 4 illustrates a system and method for server-side data capture according to an embodiment of the invention. In the illustrated example, a virtualized application 180 initiates a request 183 for an environment variable or other location-based identification or information to enable the application to provide a location-based function. Server 182 is configured to receive such requests 184 and to formulate responses, for example by performing a lookup call on a process 185. In the illustrated embodiment, rather than provide the response directly to application 180, the server 182 is configured to provide this response as a contingent response to client 181. Client 181 is configured to capture this contingent response 187 and evaluate it to determine its appropriateness. For example, client 181 may evaluate the captured response to determine if the response comprises location-based information 188 that should be modified to reflect the client location-based information. If so, client 181 is configured to replace and reconfigured the response 189 to reflect the client location-based information, rather than the server location-based information. Client 181 then provides the reconfigured response to application 190. If the response is appropriately server-side-based then the client 181 provides the contingent response as the actual response to the application's request 190. Accordingly, in response to the request for information 183, the application receives either server-based location information or client-based location information, as determined by a preconditioned evaluation.

Figure 5:
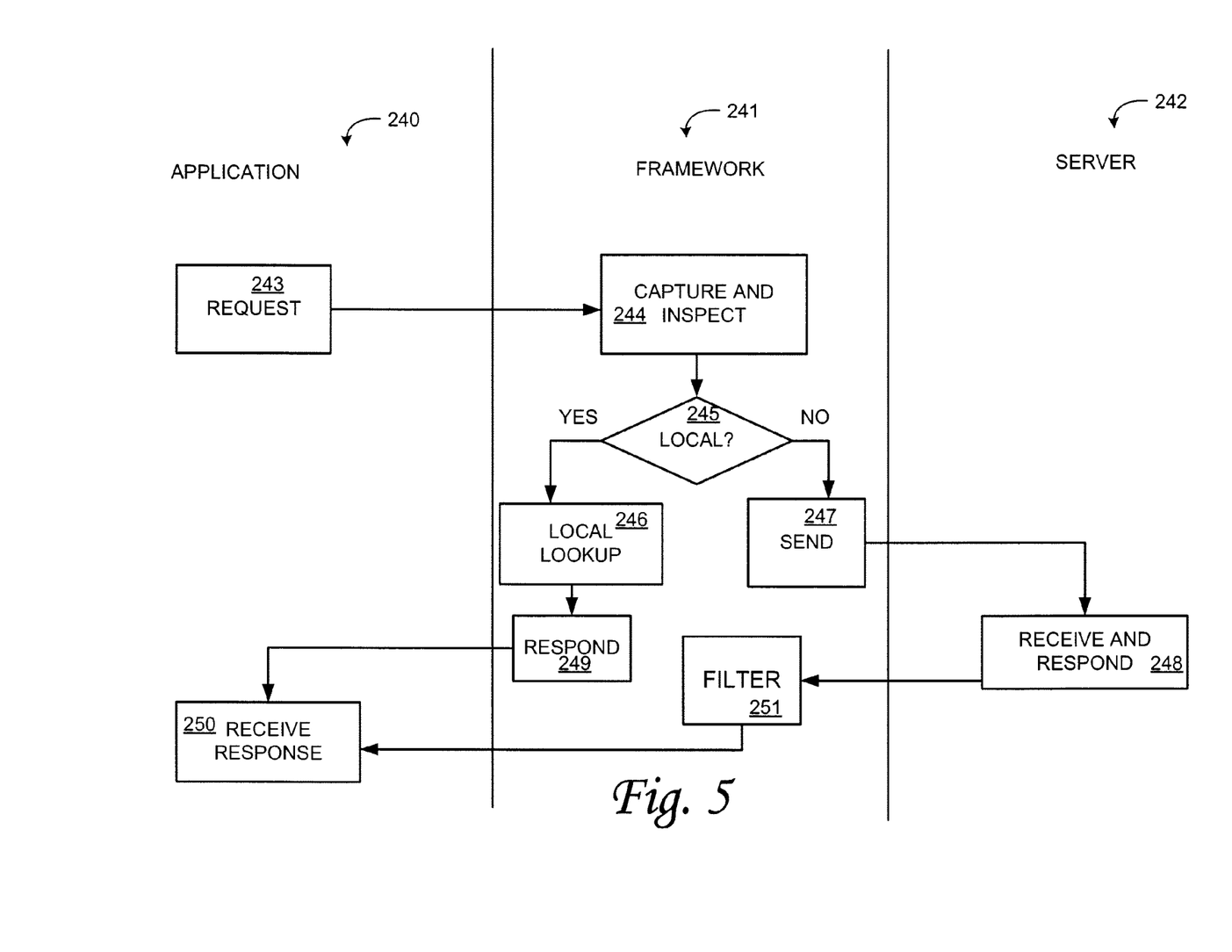
FIG. 5 illustrates a system and method of environment variable capture for web based applications according to an embodiment of the invention.

FIG. 5 illustrates a system and method of computer memory capture for framework based applications such as a web client according to an embodiment of the invention. In various embodiments, the systems and methods described herein may be applied to any framework host application, for example browser-based or web client-based applications. For example, in the illustrated embodiment, an application 240 may be configured such that instances of the application 240 may be embodied on a web browser 241 such that some processing is carried out by the web browser and some utilized data is provided by a server 242. In this embodiment, browser 241 is configured such that environment variable requests 243 are captured and inspected 244 before they are provided to server 242. The browser is further configured to evaluate the transmitted request in view of predetermined conditions. For example, browser 241 may be configured to evaluate 245 the request to determine if it should be responded to with local or client location-based information or server location-based information. If evaluation 245 determines that the request should be handled by server 242, then the browser 241 may provide 247 the server with the request such that the server 242 may receive the request and respond appropriately 248, and provide the response to application 240. A client logic filter 251 may be provided to receive the server response and forward it to the application 250 or perform further evaluation to assure the response is appropriate. If evaluation 245 determines that the request should be handled by the client, the browser 241 may provide the request to the client operating system such that the client operating system evaluates the request 246 and responds 249. Accordingly, the browser-based application instance 240 is provided 250 with local environmental information or server environment information, such that the application may provide local resources or functions or server resources or functions depending on predetermined conditions.

Figure 6:
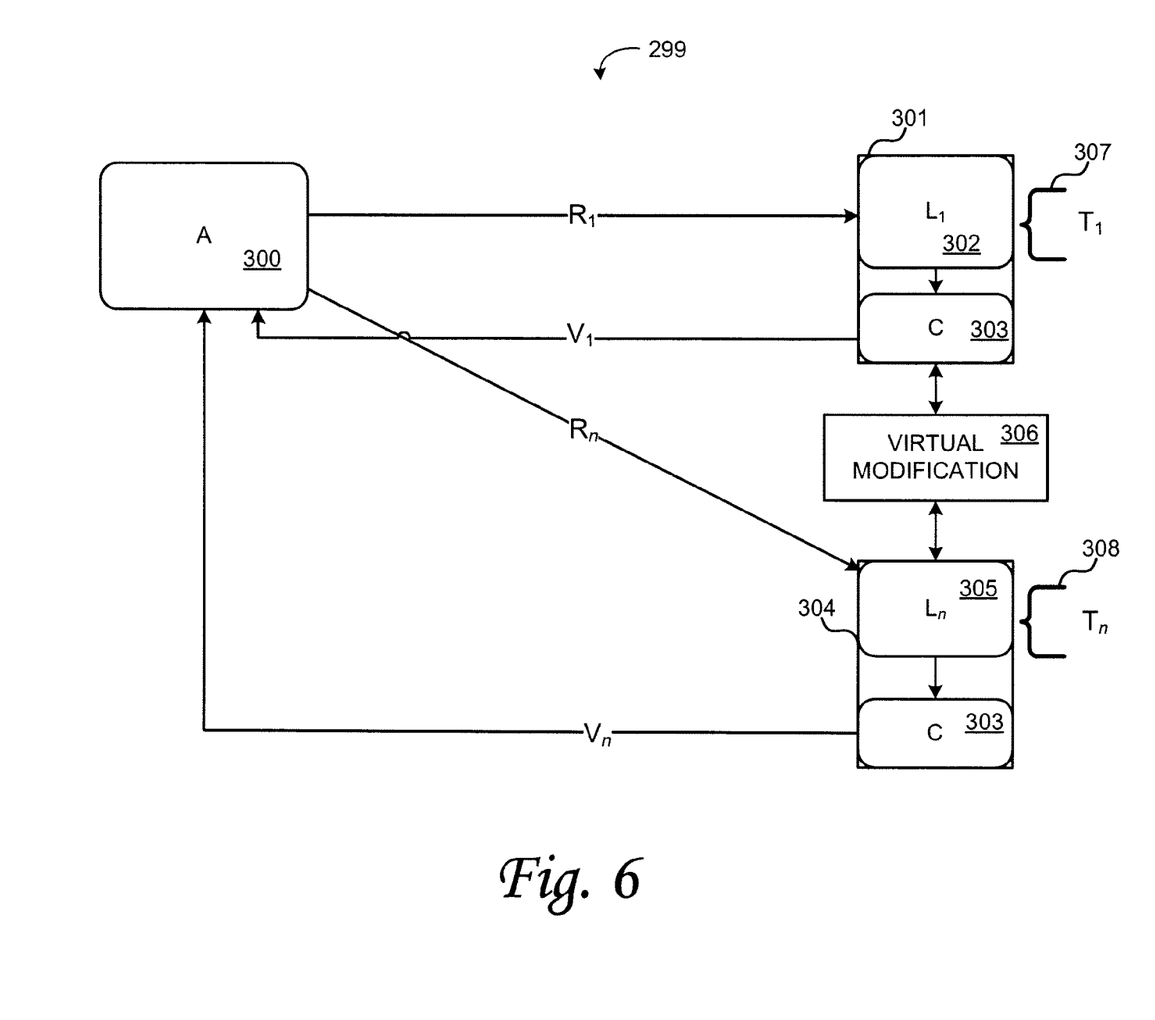
FIG. 6 illustrates a dynamically updated multi-terminal deployment according to an embodiment of the invention.

The systems and methods described herein may be implemented to allow applications that require dynamic computer memory updates represented by environmental variables or other demographic or location-based information to correctly function in a virtual environment, and to allow such applications to be dynamically updated with such variables as a user accesses the same virtual session from alternative locations. FIG. 6 illustrates such an implementation according to an embodiment of the invention. In the illustrated embodiment, a virtualized application 300 is run on a virtual desktop session 299. A user accesses this virtual desktop session from a first terminal 301 at a first location 302. When the user requests the application to perform location-based functions or to utilize location-based resources, the application initiates an information request $R_1$. As described herein, such a request may be captured and reconfigured 303 such that the returned information or variable $V_1$ corresponds to the appropriate information with respect to the first location 302.

In further embodiments, a virtual environment may be modified 306 such that updated location-based information at one terminal reflects location-based information of another terminal. As FIG. 6 illustrates, the virtual environment may be modified 306 such that as a user accesses 304 the virtual session from multiple locations, such as location $L_n$ 305, the systems and methods for capturing and returning the appropriate location-based information 303 may be dynamically updated such that in response to a request initiated by a user at location 305, $R_n$, at event $T_1$ 307 the application 300 receives a response that reflects the location-based information of location 305, $V_n$ at event $T_n$ 308. For example, in server-side systems and methods of information capture, the server may update its mode of recapture (e.g., by updating a modified DLL), each time a user locks one terminal and activates another. As another example, in client-side systems and methods of information capture, each client location may be configured to intercept and properly respond to requests from application 300, such that the application 300 receives the correct client location-based information. For example, a clinic may comprise a physician's office and a number of patient examination rooms where the office and each room has a terminal to access a virtualized desktop session. Using the methods and systems described herein, this clinic may be configured such that information requests from examination room terminals reflect the examination room location if the request is for information corresponding to an instrument and reflected the office location if the request is for information corresponding to a printer.

Figure 7:
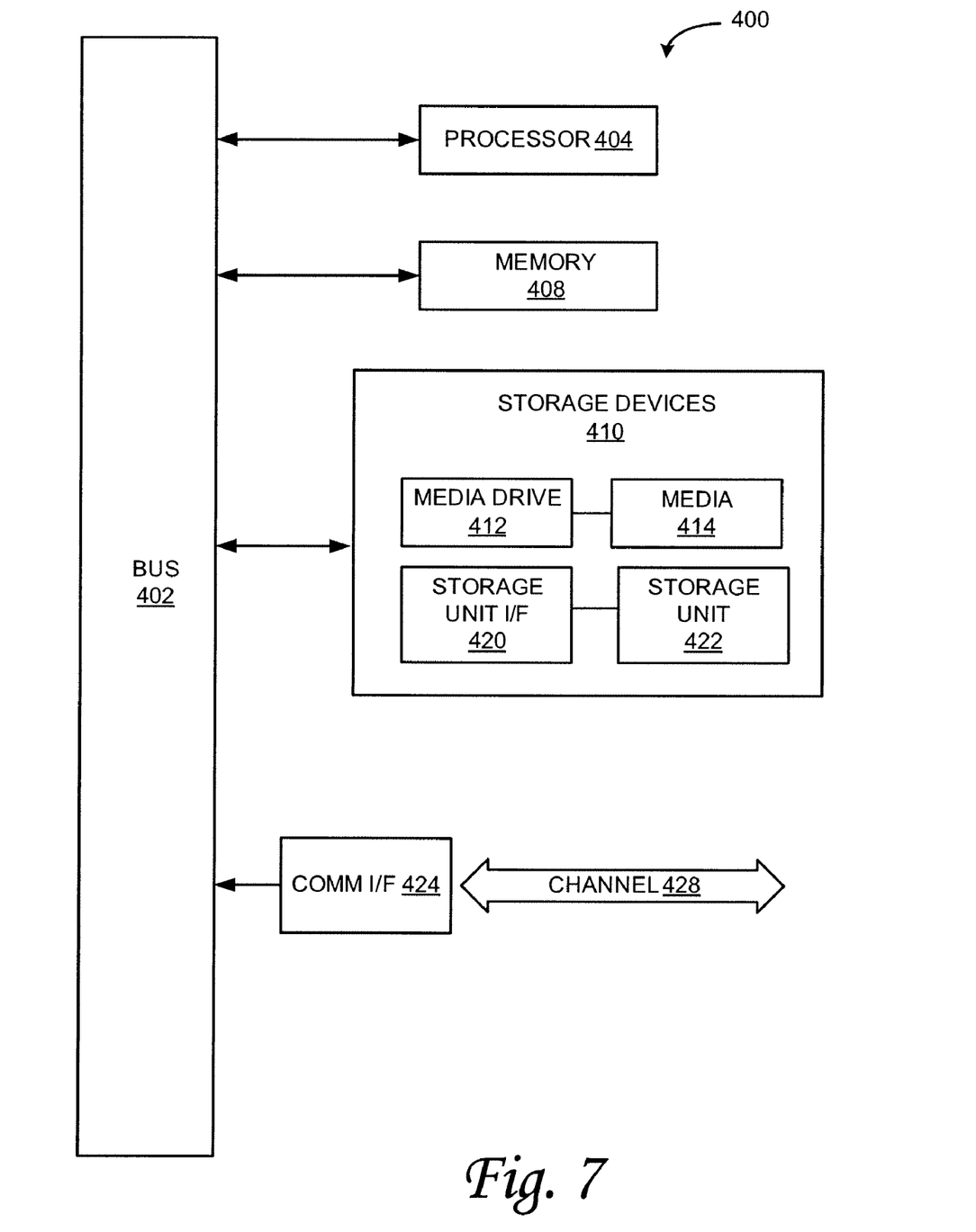
FIG. 7 illustrates an example computing module with which various embodiments of the invention may be implemented.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 400. After reading this description, it will become apparent to a person skilled in the relevant art how to implement the invention using other computing modules or architectures.

Referring now to FIG. 7, computing module 400 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 420, media 414, and signals on channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of updating client information, comprising:
receiving an application information request from a virtual application hosted by a server, the application information request comprising an operating system function call;
intercepting the application information request prior to completing the operating system function call;
determining that the intercepted application information request is for location-based information;
requesting and receiving the location-based information from a client device over a network in response to the determination; and
responding to the application information request based on the client location-based information.

2. The method of claim 1, further comprising:
manipulating a computer process to reflect the received client location-based information.

3. The method of claim 2, wherein the manipulating the computer process comprises modifying the process to replace server location-based information with the received client location-based information.

4. The method of claim 1, further comprising:
modifying an operating system function associated with the operating system function call to return the received client location-based information.

5. The method of claim 1, wherein the client-based information is received from at least one of a client application or a server application.

6. The method of claim 5, wherein the client application comprises an application framework.

7. The method of claim 5, wherein the client location-based information is received after the application information request is received, and further comprising:
requesting the client-based information from the client application.

8. The method of claim 5, wherein the client location-based information is received during initiation of the virtual session.

9. A computer program product comprising a non-transitory computer useable medium having computer program code embodied therein for enabling a computing device to perform the functions of:
receiving an application information request from a virtual application hosted by a server, the application information request comprising an operating system function call;
intercepting the application information request prior to completing the operating system function call;
determining that the intercepted application information request is for location-based information;
requesting and receiving the location-based information from a client device over a network in response to the determination; and
responding to the application information request based on the client location-based information.

10. The computer program product of claim 9, wherein the computer program code further enables the computing device to manipulate a process to reflect the received client location-based information.

11. The computer program product of claim 10, wherein the manipulating the process comprises modifying the process to replace server location-based information with the received client location-based information.

12. The computer program product of claim 9, wherein the computer program code further enables the computing device to modify an operating system function associated with the operating system function call to return the received client location-based information.

13. The computer program product of claim 9, wherein the computer program code further enables the computing device to modify computer memory to reflect the received client location based information.

14. The computer program product of claim 9, wherein the computer program code further enables the computing device to modify a computer file to reflect the received client location based information.

15. The computer program product of claim 12, wherein the application information request is received from an application framework.

16. The computer program product of claim 12, wherein the client location-based information is received after the application information request is received, wherein the computer program code further enables the computing device to request the client-based information from a client application.

17. A system for providing virtual session client location-based information, comprising:
at least one processor; and
at least one memory communicatively coupled with the at least one processor; the memory comprising executable code that, when executed by the at least one processor, causes the at least one processor to execute:
a client-side application; and
a server-side application;
wherein the server-side application is configured to:
receive an application information request, the application information request comprising an operating system function call;
intercept the application information request prior to completing the operating system function call;
determine the intercepted application information request is for location-based information;
request and receive the location-based information from the client-side application in response to the determination; and
respond to the application information request based on the client location-based information.

18. The system of claim 17, wherein the server-side application is configured to modify a process to replace server location-based information with the client location-based information.

19. The system of claim 17, wherein the client-side application is configured to obtain the client location-based information from a client terminal and send the client location-based information to the server-side application.

20. The system of claim 19, wherein the client-side application is configured to obtain the client location-based information in response to a request from the server-side application.

21. The system of claim 19, wherein the client-side application is configured to send the client location-based information to the server side application during initiation of the virtual session.

22. The system of claim 17, wherein the client-side application comprises an application framework.

* * * * *